United States Patent [19]

Boss

[11] Patent Number: 5,072,982
[45] Date of Patent: Dec. 17, 1991

[54] TUBULAR TWEEZER

[75] Inventor: Harold O. Boss, Corona del Mar, Calif.

[73] Assignee: Loral Aerospace Corp., New York, N.Y.

[21] Appl. No.: 485,697

[22] Filed: Feb. 27, 1990

[51] Int. Cl.$^5$ .......................... B66C 1/42; B23P 19/04
[52] U.S. Cl. ................. 294/103.1; 294/19.1; 294/102.1; 29/758
[58] Field of Search ............... 294/103.1, 102.1, 102.2, 294/19.1, 99.2, 100, 94, 96, 86.8, 36.31; 29/739, 740, 758, 764

[56] References Cited

U.S. PATENT DOCUMENTS

| | | | |
|---|---|---|---|
| 1,324,500 | 12/1919 | Francis | 294/86.31 |
| 1,551,043 | 8/1925 | Moses . | |
| 2,615,181 | 10/1952 | McGaughey . | |
| 3,195,380 | 7/1965 | Bicks . | |
| 4,028,790 | 6/1977 | Dupuis . | |
| 4,168,569 | 9/1979 | Fairbairn | 29/758 X |
| 4,171,565 | 10/1979 | Boudreau et al. . | |
| 4,268,955 | 5/1981 | Daniels . | |
| 4,414,736 | 11/1983 | Fieberg et al. . | |

Primary Examiner—Margaret A. Focarino
Assistant Examiner—Dean J. Kramer
Attorney, Agent, or Firm—Harry G. Weissenberger; Edward J. Radlo; Keith L. Zerschling

[57] ABSTRACT

A tool (10) for handling fiber optic connectors (46) in narrow spaces features a thin collet tube (34) tapered at its end (42), and a pintle (32) axially movable within the collet tube (34) with a generally axially oriented grasping surface (52) at its end (40). The taper of the tube (34) forces the grasping surface (52) toward the inside wall (48) of the collet tube (34) when the pintle (32) is extended through the tube (34). The tang (44) of a fiber optic connected (46) is grasped between the grasping surface (52) and the collet tube wall (48). The tip (56) of the collet tube (34) is inclined to prevent damage to the optical fiber (54). By slotting the collet tube tip (60), transversely extending workpieces (62) may also be grasped.

8 Claims, 6 Drawing Sheets 5,072,982

TUBULAR TWEEZER

LICENSE RIGHTS

This invention is a Subject Invention under U.S. Army contract DAAH01-88-C-0570, and the U.S. Government has certain license rights thereunder.

FIELD OF THE INVENTION

This invention relates to tweezer-type tools for handling small parts, and more particularly to a tubular tweezer for installing fiber optic connectors.

BACKGROUND OF THE INVENTION

The handling of parts small enough to require assembly under optical magnification requires highly specialized tooling. For example, in the manufacture of fiber optic sensors on traction drives for small optical scanners, it is necessary to install (and possibly remove) fiber optic connectors less than a half-millimeter in diameter in inaccessible locations without scratching the optical coating on the fiber. This operation requires a needle-like tool of minimal diameter capable of gripping and releasing the handling tang of a fiber optic connector in a narrow space.

Prior art in this field includes U.S. Pat. No. 1,551,043 to Moses, which uses spring-released clamps to grip a pan; U.S. Pat. No. 2,615,181 to McGaughey and U.S. Pat. No. 3,195,380 to Bicks in which a wire is held between two open jaws against spring pressure; U.S. Pat. No. 4,028,790 to Dupuis which shows a circuit board pin puller using a wedge action to grip the pin but with a mechanism not suitable for minimalizing the tool diameter; U.S. Pat. No. 4,171,565 to Boudreau et al. which shows a contact insertion probe with no operating mechanism; and U.S. Pat. No. 4,268,955 to Daniels and U.S. Pat. No. 4,414,736 to Fieberg et al., in which a contact insertion tool holds the contact between two open jaws under spring pressure.

DESCRIPTION OF THE INVENTION

The fiber optic connector handling tool (10) of this invention allows the diameter of the tool's grasping tip (36) to be minimized, and essentially eliminates any possibility of scratching the optical fiber (54) during handling, by using a wedge action between the inside wall (48) of a tapered collet tube (34) and a tapered pintle (32) to grip the connector tang (44) between the pintle (32) and the collet tube wall (48). The tip (56) of the collet tube (34) is inclined in such a way that when the tang (44) is grasped, the farthest-protruding portion (48) of the collet tube (34) is on the connector side of the tang (44), where the connector (46) protects the fiber (54) from contact with the collet tube (34).

DESCRIPTION OF THE PREFERRED EMBODIMENT

Figure 1:
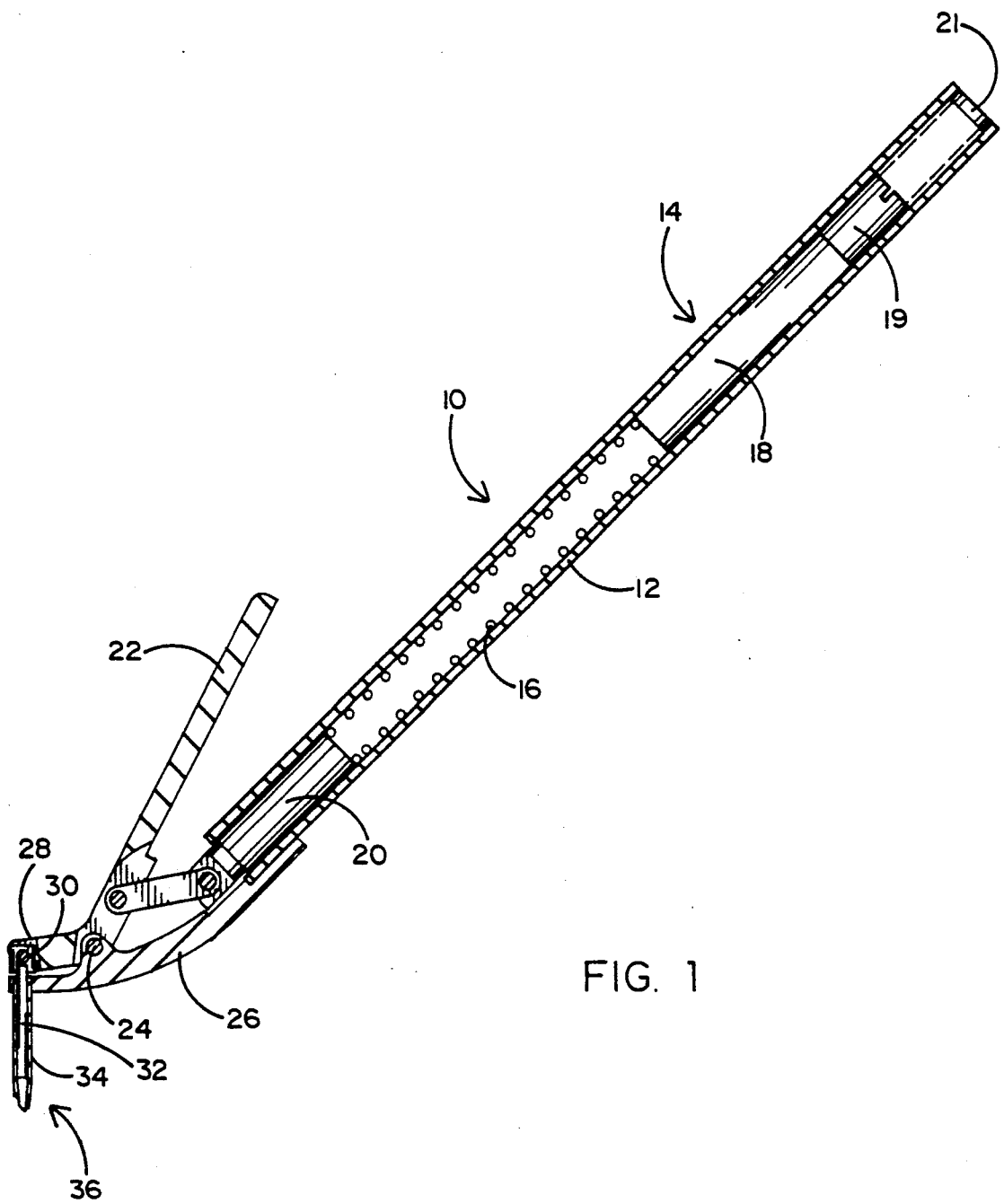
FIG. 1 is an overall view, partially cut away, of the tool of this invention in the grasping position.
Figure 2:
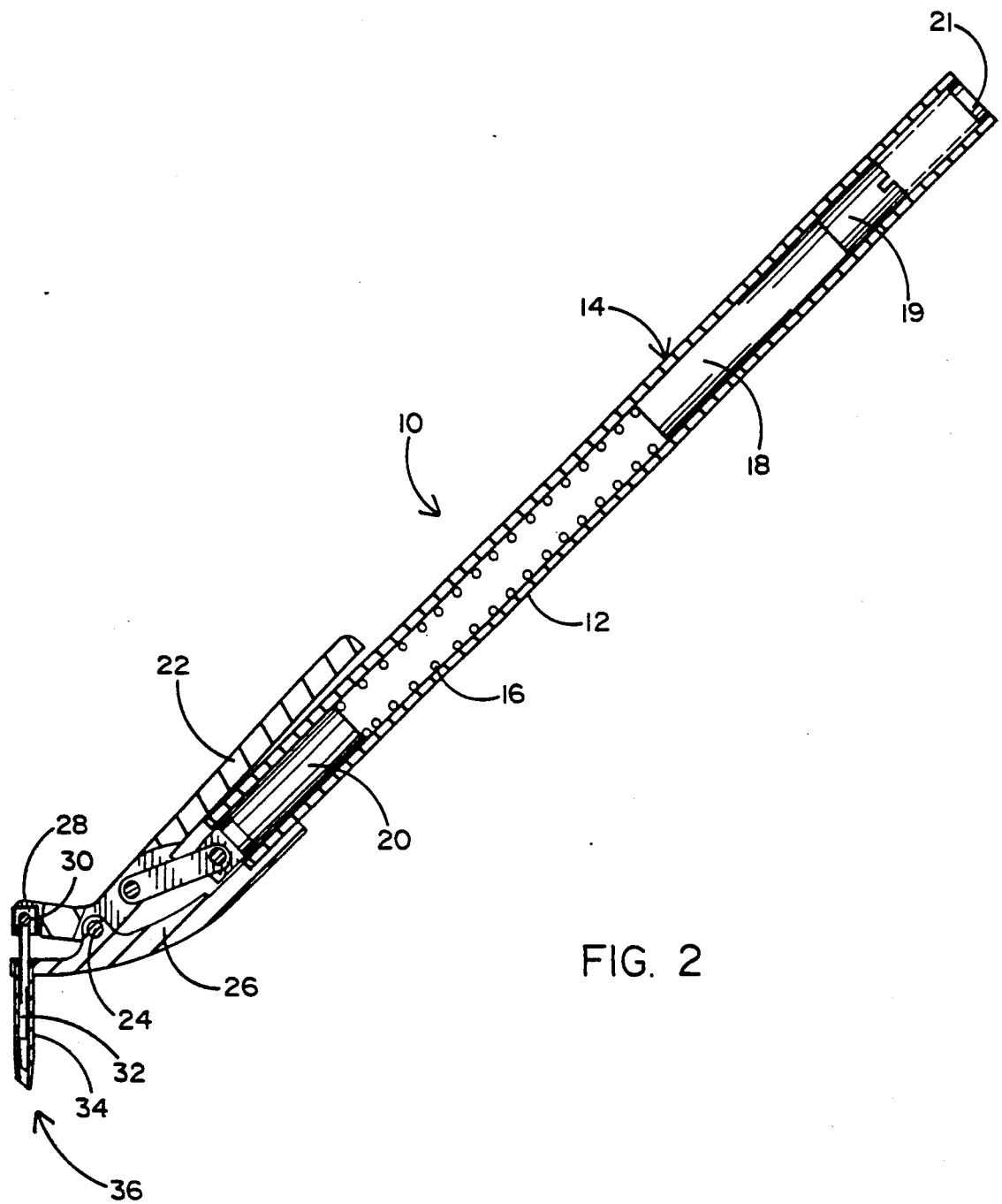
FIG. 2 is a view similar to FIG. 1 but showing the tool in the releasing position.

As best seen in FIGS. 1 and 2, the tool 10 of this invention has a hollow barrel 12 which serves as the handle 14. A spring 16 is retained in the barrel 12 by a fixed plug 18 and biases the piston 20 downwardly in FIGS. 1 and 2. This action in turn biases the actuating lever 22 into the position of FIG. 1. The lever 22, which is pivoted at pivot 24 in the arm 26 fixed to the barrel 12, has a slotted nose 28 which engages the pin 30 of pintle 32 to move it up and down within the collet tube 34 of the grasping tip 36.

Figure 3:
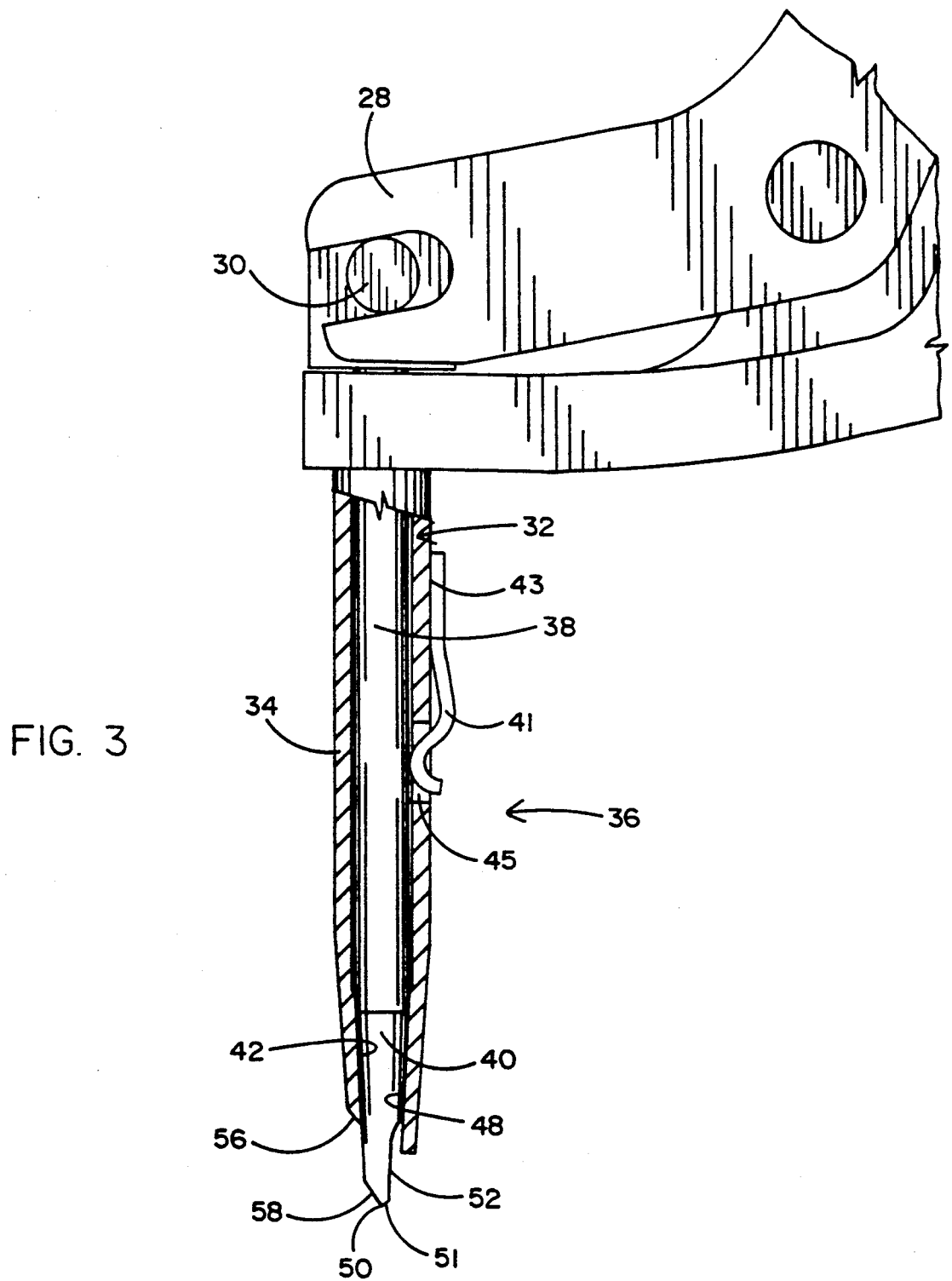
FIG. 3 is a detail sectional view of the grasping tip with the pintle fully extended but with no article being grasped.
Figure 4:
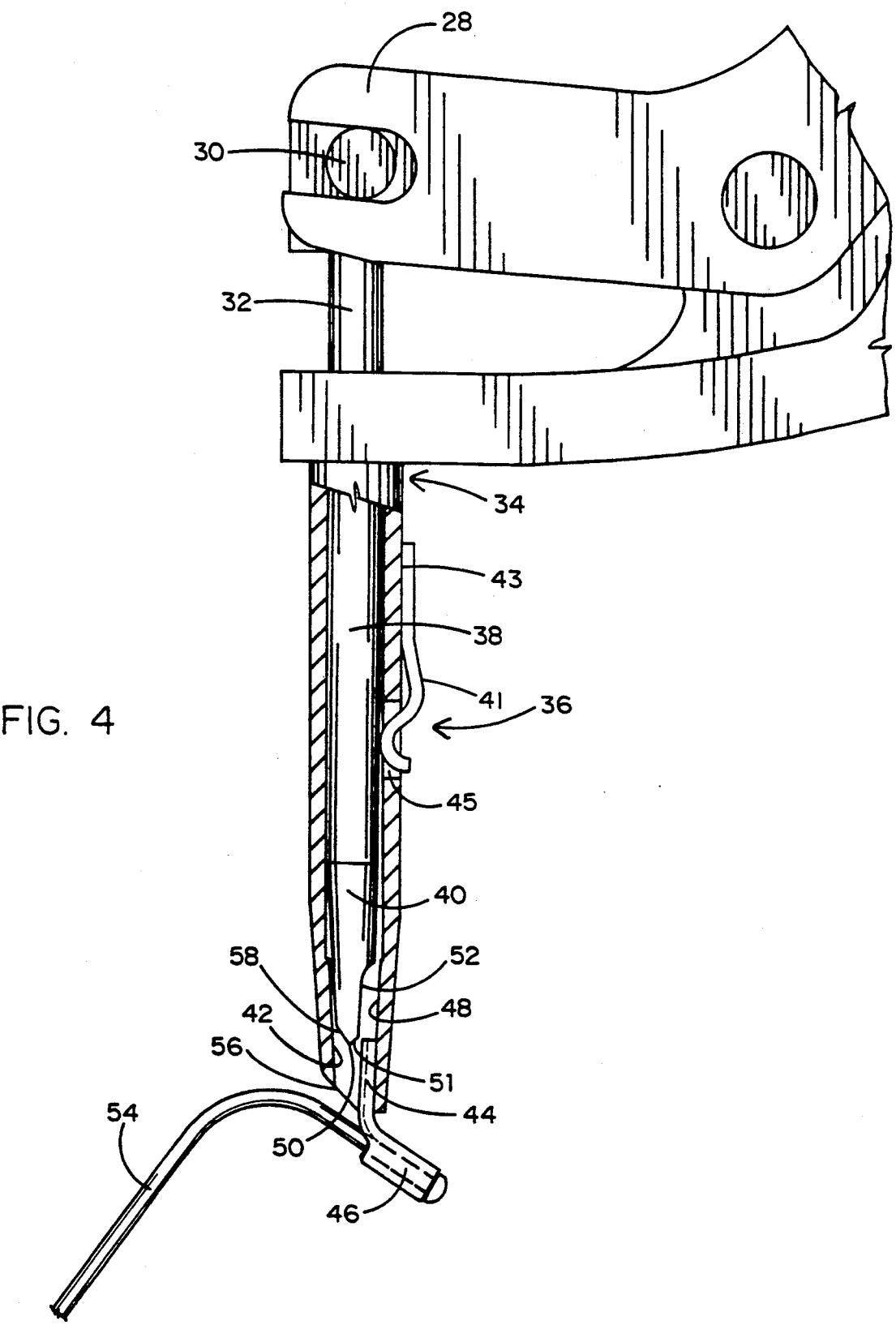
FIG. 4 is a detail sectioned view similar to FIG. 3 but showing the grasping tip in the releasing position.

FIGS. 3 and 4 are detail views of the grasping tip in the unloaded grasping position of FIG. 1 and in the releasing position of FIG. 2, respectively. In the position of FIG. 3, the pintle 32, which has a cylindrical portion 38 and a generally conical distal portion 40, is held coaxially with the collet tube 34 by the wedge action of the a cylindrical portion 38 and a generally conical distal portion 40, is held coaxially with the collet tube 34 by the wedge action of the inwardly tapered lower or distal end 42 of the collet tube 34. It will be noted that the diameter of pintle 32 is smaller than the inside diameter of collet tube 34, and that the wedge action limits the downward movement of pintle 32 in collet tube 34.

In the releasing position of FIG. 4, the pintle 32 is biased against the left wall of collet tube 34 by a spring 41 which may be welded to the collet tube 34 at 43, and which protrude into the interior of collet tube 34 through an opening 45.

Figure 5:
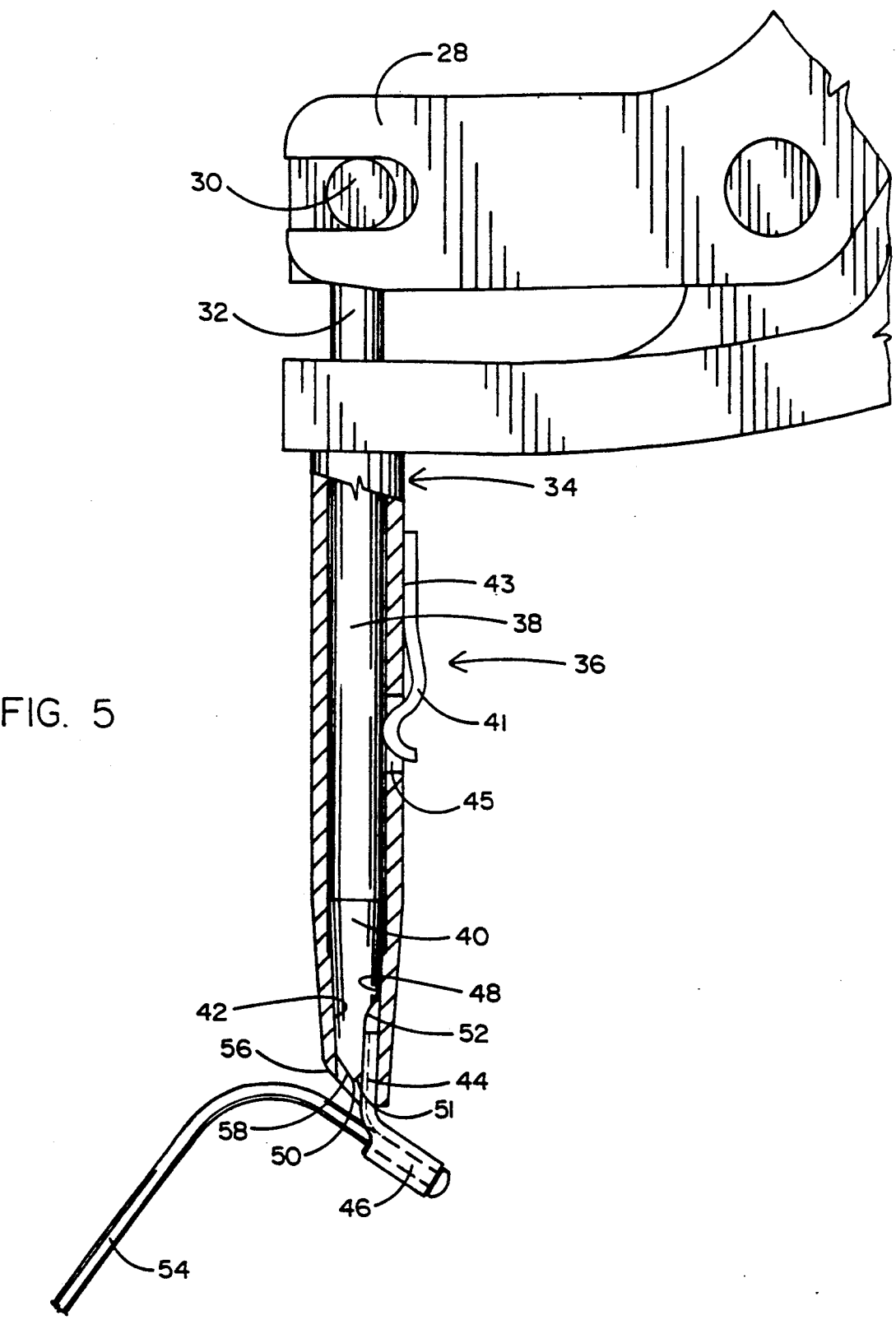
FIG. 5 is a detail sectional view similar to FIG. 3 but showing a fiber optic connector being grasped.

FIG. 5 illustrates the manner in which the tool 10 grasps the tang 44 of a fiber optic connector 46. When the tang 44 is placed against the inside wall 48 of the collet tube 34, and the pintle 32 is allowed to descend from the releasing position of FIG. 4 (the spring 41 holding pintle 32 out of snagging contact with the tang 44), the taper 42 forces the conical portion 40 toward the right in FIG. 5. The parameters of the taper are such that the tip 50 of the pintle 32 (particularly with the assistance of inclined guide surface 51) will initially clear the tang 44 but eventually contact it with a sufficient portion of the pintle grasping surface 52 to firmly engage and hold the tang 44 between the surface 52 and wall 48. It will be noted in FIG. 5 that when the tang 44 is grasped, the tip of the tool 10 is well clear of the optical fiber 54 because of the inclinations 56, 58 of the tips of collet tube 34 and pintle 32, respectively.

Figure 6:
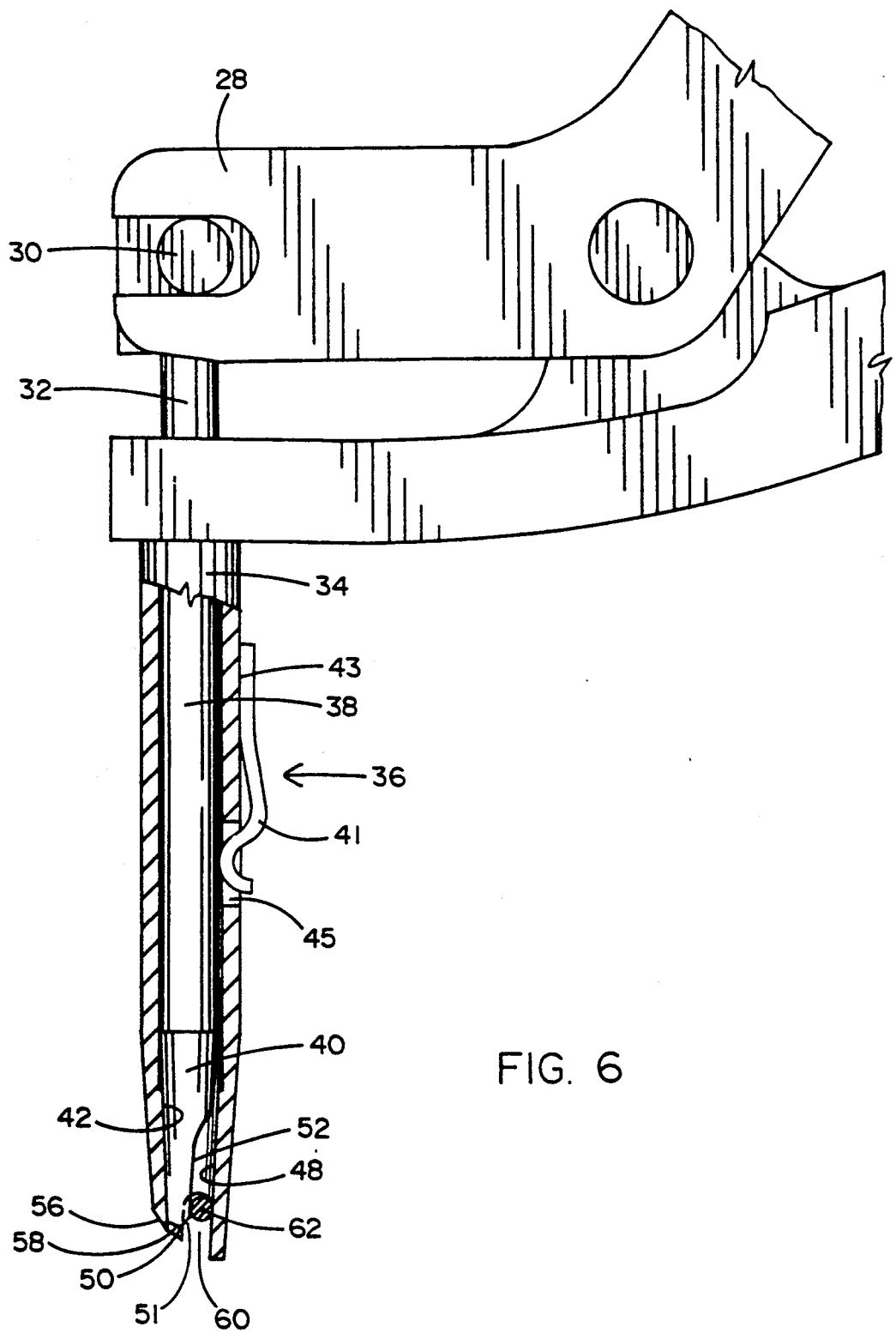
FIG. 6 is a detail sectional view similar to FIG. 3 but showing an alternative embodiment of the tool capable of also grasping a transverse wire.

FIG. 6 shows that by providing a slot 60 in the tip of collet tube 34, the tool 10 can also be used to grasp a transversely extending work piece such as a wire or small pin 62.

The fact that the grasping tip 36 consists of only two concentric parts makes it possible to minimize the outside diameter of the grasping tip 36 while maintaining its structural integrity and strength. This is important in the intended environment of the tool 10, where the grasping tip is typically required to be less than one millimeter in diameter, and at least one centimeter in length.

I claim:

1. A tool for handling fiber optic connectors, comprising:

a) a handle;

b) a thin, elongated collet tube extending from said handle, said tube having an internal surface defining a passage, a distal end portion of said internal surface being inwardly tapered;

c) a pintle axially movable within said passage of said tube, said pintle having a diameter smaller than the diameter of said passageway and being transversely movable therein, said tube having an object grasping wall portion and an opposite wall portion on opposite sides of said passage;

d) spring means for biasing said pintle transversely toward said opposite wall portion toward a releasing position;

e) a recessed substantially axially oriented grasping surface formed on said pintle at a distal end portion of said pintle, said surface being adapted to bias an object to be grasped against said object grasping wall portion of said tube;

f) said inwardly tapered portion of said internal surface being arranged to engage said distal end portion of said pintle so as to move said grasping surface transversely toward said object grasping wall portion when said pintle is moved axially toward said distal end portion of said tube; and g) actuating means on said handle for moving said pintle axially within said tube.

2. The tool of claim 1, in which said actuating means include biasing means for biasing said pintle in one direction of axial motion, and manually operable means for moving said pintle in the opposite axial direction.

3. The tool of claim 2, in which said biasing means bias said pintle for movement toward said distal end portion of said tube.

4. The tool of claim 1, in which the distal end of said pintle is tapered to match the taper of said distal end portion of said tube.

5. The tool of claim 1, in which the tip of said distal end portion of said tube is inclined in such a way as to make the side of said tube adjacent said surface the farthest distally extending side.

6. The tool of claim 5, in which the tip of the distal end of said pintle is inclined in the same direction as the tip of the distal end of said tube.

7. The tool of claim 1, in which said distal end portion of said tube is slotted so as to allow grasping of a transversely extending object.

8. The tool of claim 5, in which an inclined guide surface is provided on the opposite side of said pintle tip from said inclined side of said pintle tip.

* * * * *